United States Patent
Seo et al.

(10) Patent No.: US 11,025,844 B2
(45) Date of Patent: Jun. 1, 2021

(54) IMAGE SENSOR AND DRIVING METHOD THEREOF

(71) Applicant: SAMSUNG ELECTRONICS CO., LTD., Suwon-si (KR)

(72) Inventors: Minwoong Seo, Hwaseong-si (KR); Seungsik Kim, Hwaseong-si (KR); Jungchak Ahn, Yongin-si (KR); Jaekyu Lee, Seongnam-si (KR); Dongmo Im, Seoul (KR); Dongseok Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/674,202

(22) Filed: Nov. 5, 2019

(65) Prior Publication Data
US 2020/0260025 A1 Aug. 13, 2020

(30) Foreign Application Priority Data

Feb. 11, 2019 (KR) .................. 10-2019-0015675

(51) Int. Cl.
*H04N 5/355* (2011.01)
(52) U.S. Cl.
CPC .................. *H04N 5/3559* (2013.01)
(58) Field of Classification Search
CPC ............ H04N 5/3359; H01L 27/14643; H01L 31/107; H01L 27/3227; H04B 10/6911
See application file for complete search history.

(56) References Cited

U.S. PATENT DOCUMENTS

| | | |
|---|---|---|
| 6,927,796 B2 | 8/2005 | Liu et al. |
| 6,975,355 B1 | 12/2005 | Yang et al. |
| 8,946,610 B2 | 2/2015 | Iwabuchi et al. |
| 9,077,922 B2 | 7/2015 | Wakano et al. |
| 9,337,228 B2 | 5/2016 | Sa et al. |
| 9,607,971 B2 | 3/2017 | Asayama et al. |
| 9,613,994 B2 | 4/2017 | Yamashita |
| 9,749,559 B2 | 8/2017 | Mabuchi et al. |
| 9,774,801 B2 | 9/2017 | Hseih et al. |
| 10,021,331 B2 | 7/2018 | Sakakibara et al. |
| 10,026,771 B1 | 7/2018 | Lee et al. |

(Continued)

OTHER PUBLICATIONS

David Schor, "IEDM 2017: Sony's 3-layer stacked CMOS image sensor technology", https://fuse.wikichip.org/news/763/iedm-2007-sonys-3-layer-stacked-cmos-image-sensortechnology, Feb. 3, 2018, pp. 1-5.

*Primary Examiner* — Yogesh K Aggarwal
(74) *Attorney, Agent, or Firm* — F. Chau & Associates, LLC

(57) ABSTRACT

A method of driving an image sensor includes integrating an overflowed charge from a photodiode in the floating diffusion area and a dynamic range capacitor. The dynamic range capacitor is formed between the floating diffusion area and a power supply voltage. The method further includes sampling a first voltage formed in the floating diffusion area by the integrated overflowed charge, resetting the photodiode, the floating diffusion area, and the dynamic range capacitor, sampling a reset level of the reset floating diffusion area, transferring a charge accumulated in the photodiode to the floating diffusion area, and sampling a second voltage formed in the floating diffusion area.

20 Claims, 10 Drawing Sheets

(56) References Cited

U.S. PATENT DOCUMENTS

| | | |
|---|---|---|
| 2004/0141079 A1 | 7/2004 | Yamaguchi et al. |
| 2010/0276572 A1 | 11/2010 | Iwabuchi et al. |
| 2013/0200479 A1* | 8/2013 | Sakano ............. H01L 27/14689 257/435 |
| 2014/0203956 A1 | 7/2014 | Meynants et al. |
| 2017/0317061 A1 | 11/2017 | Takahashi et al. |
| 2017/0324916 A1 | 11/2017 | Sugawa et al. |
| 2017/0332022 A1 | 11/2017 | Zhou |
| 2017/0347049 A1 | 11/2017 | Maehashi |
| 2018/0182807 A1 | 6/2018 | Kim et al. |
| 2019/0373168 A1* | 12/2019 | Balar ................... H04N 5/3559 |

* cited by examiner

④ FD Reset & Sampling(R)

⑤ 2$^{nd}$ Sampling(S2)

IMAGE SENSOR AND DRIVING METHOD THEREOF

CROSS-REFERENCE TO RELATED APPLICATIONS

This application claims priority under 35 U.S.C. § 119 to Korean Patent Application No. 10-2019-0015675, filed on Feb. 11, 2019 in the Korean Intellectual Property Office, the disclosure of which is incorporated by reference herein in its entirety.

TECHNICAL FIELD

Exemplary embodiments of the inventive concept relate to an image sensor, and more particularly, to a wide dynamic range (WDR) image sensor and a driving method thereof.

DISCUSSION OF THE RELATED ART

Criteria for determining the quality of an image sensor includes a dynamic range. In general, the dynamic range indicates a maximum range capable of processing a signal without distortion of an input signal. As the dynamic range becomes wider, an image obtained by the image sensor may become clearer within a wide illuminance range.

In general, in the case in which a specific color is saturated due to a narrow dynamic range, the image sensor fails to express an original color of the image. To overcome the above issue due to the narrower dynamic range, various attempts have been made to implement a wide dynamic range (WDR) pixel.

SUMMARY

Exemplary embodiments of the inventive concept provide a wide dynamic range (WDR) image sensor that is implemented in a small area and eliminates or decreases a signal-to-noise ratio (SNR) dip occurring in merging a low-illuminance image and a high-illuminance image, and an operating method thereof.

According to an exemplary embodiment, a method of driving an image sensor includes integrating an overflowed charge from a photodiode in a floating diffusion area and a dynamic range capacitor. The dynamic range capacitor is formed between the floating diffusion area and a power supply voltage. The method further includes sampling a first voltage formed in the floating diffusion area by the integrated overflowed charge, resetting the photodiode, the floating diffusion area, and the dynamic range capacitor, sampling a reset level of the reset floating diffusion area, transferring a charge accumulated in the photodiode to the floating diffusion area, and sampling a second voltage formed in the floating diffusion area.

According to an exemplary embodiment, an image sensor includes a photodiode that generates a charge in response to an incident light, a floating diffusion area in which the charge transferred from the photodiode is stored, a transfer transistor that connects the photodiode to the floating diffusion area in response to a transfer signal, a dynamic range capacitor that expands a capacity of the floating diffusion area, a dual conversion gain transistor that connects the dynamic range capacitor and the floating diffusion area in a high-illuminance mode and disconnects the dynamic range capacitor from the floating diffusion area in a low-illuminance mode, and a reset transistor that connects the dual conversion gain transistor and a power supply voltage in response to a reset signal. The dynamic range capacitor is formed of a cylinder-type electrode and a dielectric, and is formed in a semiconductor layer different from the floating diffusion area.

According to an exemplary embodiment, a method of driving an image sensor includes integrating an overflowed charge from a photodiode with a first full well capacity, sampling a first voltage formed by the overflowed charge integrated with the first full well capacity, sampling a reset level of a floating diffusion area, integrating a charge accumulated in the photodiode with a second full well capacity smaller than the first full well capacity, sampling a second voltage formed by the charge integrated with the second full well capacity, generating a high-illuminance image signal using the first voltage and the reset level, and generating a low-illuminance image signal by processing the second voltage and the reset level in a correlated double sampling manner.

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION

Figure 1:
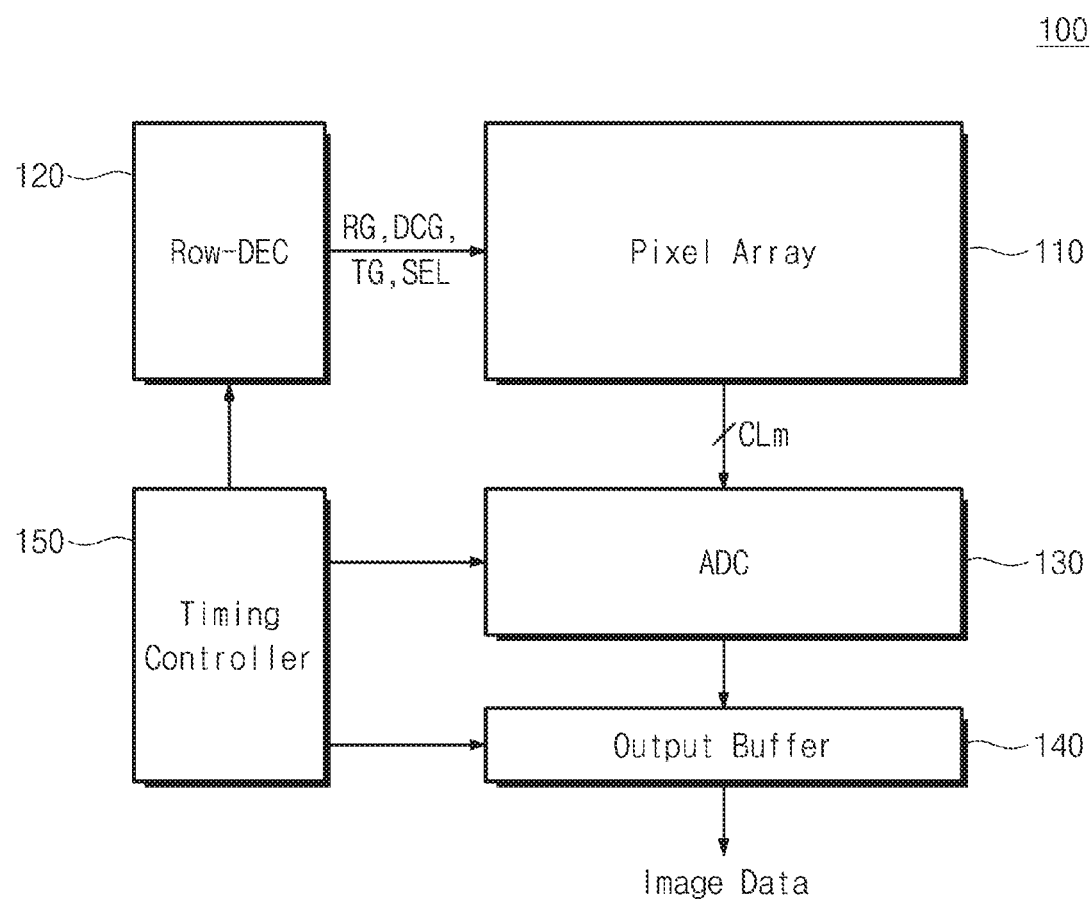
FIG. 1 is a block diagram illustrating an image sensor according to an exemplary embodiment of the inventive concept.

Exemplary embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

It should be understood that descriptions of features or aspects within each exemplary embodiment should typically be considered as available for other similar features or aspects in other exemplary embodiments, unless the context clearly indicates otherwise.

As used herein, the singular forms "a", "an" and "the" are intended to include the plural forms as well, unless the context clearly indicates otherwise.

FIG. 1 is a block diagram illustrating an image sensor according to an exemplary embodiment of the inventive concept.

Referring to FIG. 1, an image sensor 100 may include a pixel array 110, a row decoder 120, an analog-to-digital converter 130, an output buffer 140, and a timing controller 150.

The pixel array 110 includes a plurality of pixel sensors arranged two-dimensionally. Each of the pixel sensors converts an optical signal into an electrical signal. The pixel array 110 may be controlled by sensor driving signals from the row decoder 120, such as, for example, a selection signal SEL, a reset signal RG, a dual conversion gain control signal DCG, and a transfer signal TG. Electrical signals that are sensed by the pixel sensors in response to the sensor driving signals are provided to the analog-to-digital converter 130 through a plurality of column lines CLm.

Figure 2:
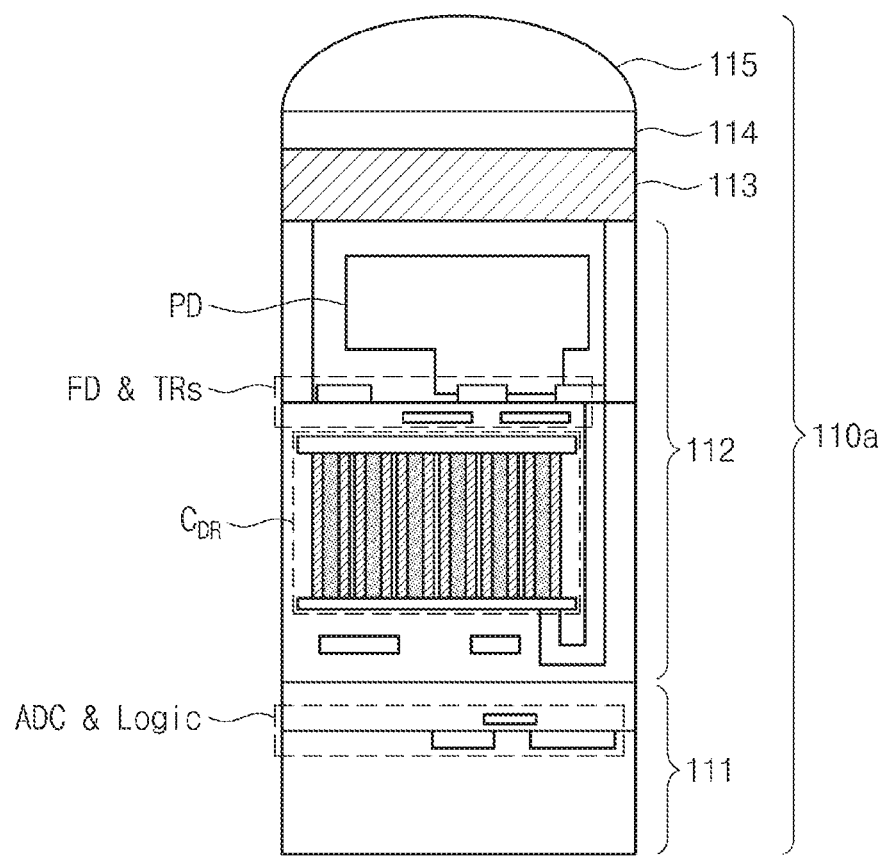
FIG. 2 is a cross-sectional view illustrating a vertical structure of a pixel sensor included in a pixel array of FIG. 1 according to an exemplary embodiment of the inventive concept.

Each of the plurality of pixel sensors included in the pixel array 110 may include a dynamic range capacitor $C_{DR}$ (see FIG. 2). In a high-illuminance mode of operation, a pixel sensor may store overflowed charges from a photodiode PD by using the dynamic range capacitor $C_{DR}$. In a high-illuminance mode of operation, photo charges generated by light exposure at the photodiode PD may be accumulated. The overflowed charges from the photodiode PD may be accommodated by a capacity $C_{FD}$ that the floating diffusion area FD provides and a capacity that the dynamic range capacitor $C_{DR}$ provides, without saturation. The dynamic range capacitor $C_{DR}$ may be implemented with, for example, a cylinder-type capacitor for providing a sufficient capacity within the restricted area. A structure and an operation of each pixel sensor will be more fully described below.

The row decoder 120 may select any one row of the pixel array 110 under control of the timing controller 150. The row decoder 120 may generate the selection signal SEL for the purpose of selecting any one of a plurality of rows. The row decoder 120 may sequentially activate the reset signal RG and the transfer signal TG with regard to pixels corresponding to the selected row. As such, a high-illuminance sensing signal $S1_{SIG}$, a reset level R, and a low-illuminance sensing signal $S2_{SIG}$ that are generated from each of the pixels in the selected row are sequentially transferred to the analog-to-digital converter 130.

The analog-to-digital converter 130 converts the high-illuminance sensing signal $S1_{SIG}$, the reset level R, and the low-illuminance sensing signal $S2_{SIG}$ into a digital signal. The analog-to-digital converter 130 may sample the high-illuminance sensing signal $S1_{SIG}$, the reset level R, and the low-illuminance sensing signal $S2_{SIG}$ in a correlated double sampling manner, and may then convert the sampled signals into a digital signal. To this end, a correlate double samplers (CDS) may further be included in the analog-to-digital converter 130.

The output buffer 140 may latch image data provided from the analog-to-digital converter 130 in unit of a column. The output buffer 140 may temporarily store image data output from the analog-to-digital converter 130 under control of the timing controller 150, and may then output the latched (or temporarily stored) image data sequentially by a column decoder.

The timing controller 150 controls the pixel array 110, the row decoder 120, the analog-to-digital converter 130, and the output buffer 140. The timing controller 150 may supply control signals, such as, for example, a clock signal and a timing control signal, to the pixel array 110, the row decoder 120, the analog-to-digital converter 130, and the output buffer 140. The timing controller 150 may include, for example, a logic control circuit, a phase locked loop (PLL) circuit, a timing control circuit, a communication interface circuit, etc.

The configuration of the image sensor 100 according to an exemplary embodiment of the inventive concept is briefly described above. In particular, each of pixel sensors constituting the pixel array 110 may include a cylinder-type dynamic range capacitor $C_{DR}$ that may be stacked within a pixel sensor, and that allows for efficient placement of a signal line. Each pixel sensor may be provided with a sufficient capacity within the restricted area through the dynamic range capacitor $C_{DR}$. In addition, in the case of driving the pixel sensor including the dynamic range capacitor $C_{DR}$ in a low-illuminance mode and a high-illuminance mode, a wide dynamic range (WDR) that is free of a signal-to-noise ratio (SNR) dip occurring in merging low-illuminance and high-illuminance images may be implemented.

FIG. 2 is a cross-sectional view illustrating a vertical structure of a pixel sensor included in a pixel array of FIG. 1 according to an exemplary embodiment of the inventive concept.

Referring to FIG. 2, a pixel sensor 110a may be of a structure in which a plurality of plates are stacked. For example, one pixel sensor 110a may include a lower plate 111, an upper plate 112, a transparent electrode layer 113, a color filter 114, and a micro lens 115.

Various logic circuits including an analog-to-digital converter ADC may be formed in the lower plate 111. A configuration of an image sensor, which may be formed in the lower plate 111, is not limited to the example illustrated in FIG. 2. For example, the output buffer 140 (refer to FIG. 1) or a memory may be formed in the lower plate 111. Alternatively, the analog-to-digital converter ADC may be provided outside the pixel sensor 110a instead of in the lower plate 111.

The photodiode PD, the floating diffusion area FD, transistors TRs, and the dynamic range capacitor $C_{DR}$ are formed in the upper plate 112. Basic components for constituting a pixel sensor are formed in the upper plate 112. The photodiode PD may be manufactured in the form of a thin film by using a material such as, for example, an organic, Quantum Dot (QD), amorphous silicon (a-Si), or compound semiconductor. Photo charges integrated in the photodiode PD may be transferred to the floating diffusion area FD through a structure (e.g., a via) and a transfer transistor TX (see FIG. 3). For example, in the case in which the pixel sensor is driven in the high-illuminance mode, photo charges integrated in the photodiode PD may overflow and may be transferred to the dynamic range capacitor $C_{DR}$ and the floating diffusion area FD.

The dynamic range capacitor $C_{DR}$ may be provided in the form of a cylinder, as illustrated in FIG. 2, for the purpose of accommodating the large amount of overflowed photo charges from the photodiode PD in the high-illuminance mode. As shown in FIG. 2, the cylinder-type dynamic range capacitor $C_{DR}$ may be formed under the photodiode PD. For example, the dynamic range capacitor $C_{DR}$ may include a cylinder-type capacitor element formed in a semiconductor layer different from the floating diffusion area FD. In general, a capacity of a capacitor is proportional to an effective surface area of the capacitor and permittivity of a dielectric substance. To provide a capacity capable of accumulating overflowed photo charges in the high-illuminance mode, the dynamic range capacitor $C_{DR}$ according to an exemplary embodiment of the inventive concept may have a markedly increased effective surface area compared to a similar capacitor according to a comparative example. For example, the dynamic range capacitor $C_{DR}$ may be implemented in the form of a DRAM cell capacitor. That is, the dynamic range capacitor $C_{DR}$ may be formed of at least one cylinder-type capacitor.

The dynamic range capacitor $C_{DR}$ may be implemented with a cylinder that is in the form of a silicon-insulator-silicon (SIS), in which polysilicon is used for upper and lower electrodes of the dynamic range capacitor $C_{DR}$ and $SiO_2/SiN_X$ is used for a dielectric layer of the dynamic range capacitor $C_{DR}$. For example, the dynamic range capacitor may be formed of a cylinder-type electrode and a dielectric, and may be formed in a semiconductor layer different from the floating diffusion area FD. This capacitor shape corresponds to a shape of a capacitor of a general DRAM cell. However, the structure of the dynamic range capacitor $C_{DR}$ is not limited thereto, and may be variously changed or modified according to a change in a design rule or a change in conditions.

The transparent electrode layer 113, the color filter 114, and the micro lens 115 may be formed on the upper plate 112. The transparent electrode layer 113 may be formed of, for example, thin metal, graphene, transparent conducting oxide (TCO), etc. The color filter 114 may transmit light of different wavelengths. In one pixel sensor, the color filter 114 may include a plurality of filters depending on a structure of the pixel array 110. The micro lens 115 may be disposed on the color filter 114.

The pixel sensor 110a of the exemplary embodiment of FIG. 2 may include the dynamic range capacitor $C_{DR}$ for implementation of the wide dynamic range (WDR), and the dynamic range capacitor $C_{DR}$ may be a capacitor including at least one cylinder.

Figure 3:
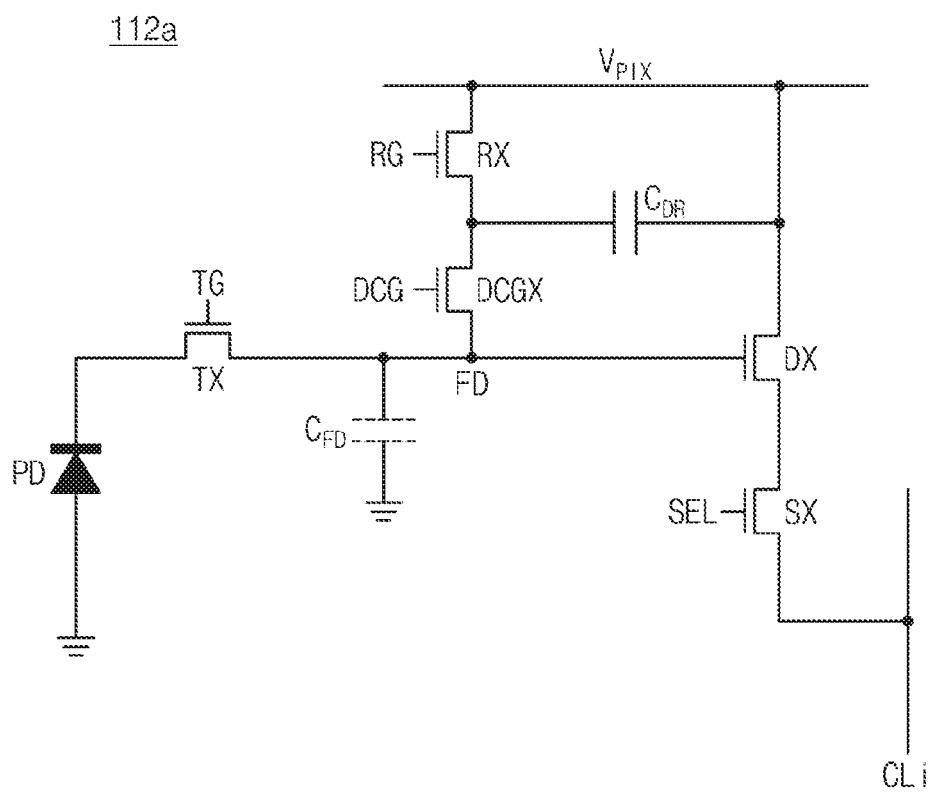
FIG. 3 is a circuit diagram illustrating a configuration of one pixel sensor according to an exemplary embodiment of the inventive concept.

FIG. 3 is a circuit diagram illustrating a configuration of one pixel sensor according to an exemplary embodiment of the inventive concept.

Referring to FIG. 3, a pixel sensor 112a according to an exemplary embodiment may be implemented with a structure including one photodiode PD, five NMOS transistors TX, RX, DX, SX, and DCGX, and the dynamic range capacitor $C_{DR}$. The pixel sensor 112a corresponds to circuit components formed in the upper plate 112 of FIG. 2.

A first end of the dynamic range capacitor $C_{DR}$ is connected to a node between the reset transistor RX and the dual conversion gain transistor DCGX. For example, the first end of the dynamic range capacitor $C_{DR}$ is connected to a source of the reset transistor RX or a drain of the dual conversion gain transistor DCGX. A second end of the dynamic range capacitor $C_{DR}$ is connected to a terminal for a power supply voltage $V_{PIX}$. As shown in FIG. 3, the dynamic range capacitor $C_{DR}$ is formed between (e.g., is electrically connected between) the floating diffusion area FD and the power supply voltage $V_{PIX}$.

In the high-illuminance mode, the reset transistor RX is turned off, and the dual conversion gain transistor DCGX is turned on. In this case, the dynamic range capacitor $C_{DR}$ is connected to the floating diffusion area FD. Overflowed charges from the photodiode PD to the floating diffusion area FD in the high-illuminance mode are shared by the dynamic range capacitor $C_{DR}$. In the high-illuminance mode, the large amount of overflowed charges from the photodiode PD may be integrated, not discarded. For example, in an exemplary embodiment, the large amount of overflowed charges from the photodiode PD are not discarded, but rather, are used as image information sensed under relatively high illuminance.

The dual conversion gain transistor DCGX may be turned off in the low-illuminance mode. In this case, the dynamic range capacitor $C_{DR}$ is electrically disconnected from the floating diffusion area FD. Accordingly, in an exemplary embodiment, charges transferred from the photodiode PD to the floating diffusion area FD are stored only in the floating diffusion area FD. Because charges are stored in a capacitance provided by the floating diffusion area FD, a high conversion gain and a low-noise characteristic may be provided.

A structure of the dynamic range capacitor $C_{DR}$ may be implemented in the form of a cylinder similar to a DRAM cell capacitor. Through the cylinder-type capacitor structure, the dynamic range capacitor $C_{DR}$ may sufficiently accommodate the large amount of overflowed charges from the photodiode PD in the high-illuminance mode.

The photodiode PD may be a light sensing element that generates and integrates charges depending on the amount of incident light or the intensity of light. The photodiode PD may also be implemented with, for example, a photo transistor, a photo gate, or a pinned photodiode (PPD).

The transfer transistor TX transfers charges integrated in the photodiode PD to the floating diffusion area FD. The transfer transistor TX may be generally implemented with one transistor, and is switched on or off in response to the transfer signal TG provided from the row decoder 120. Characteristics of the transfer transistor TX may be set such that overflowed charges from the photodiode PD in the high-illuminance mode are effectively transferred to the floating diffusion area FD and the dynamic range capacitor $C_{DR}$. For example, the transfer transistor TX may be tuned to have a potential barrier of a level at which overflowed charges flowing from the photodiode PD in the high-illuminance mode are effectively transferred toward the floating diffusion area FD.

The floating diffusion area FD may have a function to detect charges corresponding to the amount of incident light. The floating diffusion area FD may integrate charges provided from the photodiode PD while the transfer signal TG is activated. The floating diffusion area FD is connected with a gate terminal of a drive transistor DX operating as a source follower amplifier. The floating diffusion area FD may be provided with the power supply voltage $V_{PIX}$ by the reset transistor RX and the dual conversion gain transistor DCGX.

The reset transistor RX resets the floating diffusion area FD in response to the reset signal RG. The source of the reset transistor RX is connected to the drain of the dual conversion gain transistor DCGX. A source of the dual conversion gain transistor DCGX is connected with the floating diffusion area FD. When the reset signal RG and the dual conversion gain control signal DCG are activated, the reset transistor RX and the dual conversion gain transistor DCGX are turned on. As such, the power supply voltage $V_{PIX}$ is transferred to the floating diffusion area FD. In this case, charges integrated in the floating diffusion area FD may be drained to the terminal for the power supply voltage $V_{PIX}$, and a voltage of the floating diffusion area FD may be reset to a level of the power supply voltage $V_{PIX}$.

The dual conversion gain transistor DCGX changes a conversion gain of a pixel sensor in response to the dual conversion gain control signal DCG. The dual conversion gain transistor DCGX is turned on in the high-illuminance mode and is turned off in the low-illuminance mode. For example, when the dual conversion gain control signal DCG is activated in the high-illuminance mode, the dual conversion gain transistor DCGX is turned on. In this case, the dynamic range capacitor $C_{DR}$ is connected to the floating diffusion area FD and integrates overflowed charges from the photodiode PD. In contrast, when the dual conversion gain control signal DCG is deactivated in the low-illuminance mode, the dual conversion gain transistor DCGX is turned off. In this case, the dynamic range capacitor $C_{DR}$ is separated from the floating diffusion area FD. Accordingly, different conversion gains may be provided in the high-illuminance mode and the low-illuminance mode by the dual conversion gain transistor DCGX.

The drive transistor DX provides a role of a source follower amplifier for the floating diffusion area FD. The drive transistor DX amplifies a change in an electrical potential of the floating diffusion area FD and transfers the amplified change to a column line CLi through the selection transistor SX.

The selection transistor SX is used to select a pixel sensor to be read in the unit of a row. The selection transistor SX is driven by the selection signal SEL provided in the unit of a row. When the selection transistor SX is turned on, the potential of the floating diffusion area FD may be amplified through the drive transistor DX and may be transferred to a drain of the selection transistor SX. Lines for the driving signals TG, RG, and SEL of the transfer transistor TX, the reset transistor RX, and the selection transistor SX, respectively, may extend in a row direction (e.g., a horizontal direction) such that unit pixels included in the same row are simultaneously driven.

A structure of the pixel sensor 112a according to an exemplary embodiment of the inventive concept is described above as an example. The dynamic range capacitor $C_{DR}$ according to an exemplary embodiment of the inventive concept may provide a large capacity that a metal-oxide-semiconductor (MOS) capacitor or a metal-insulator-metal (MIM) capacitor fails to provide. Accordingly, overflowed charges from the photodiode PD in the high-illuminance mode may be integrated by using the dynamic range capacitor $C_{DR}$.

Figure 4:
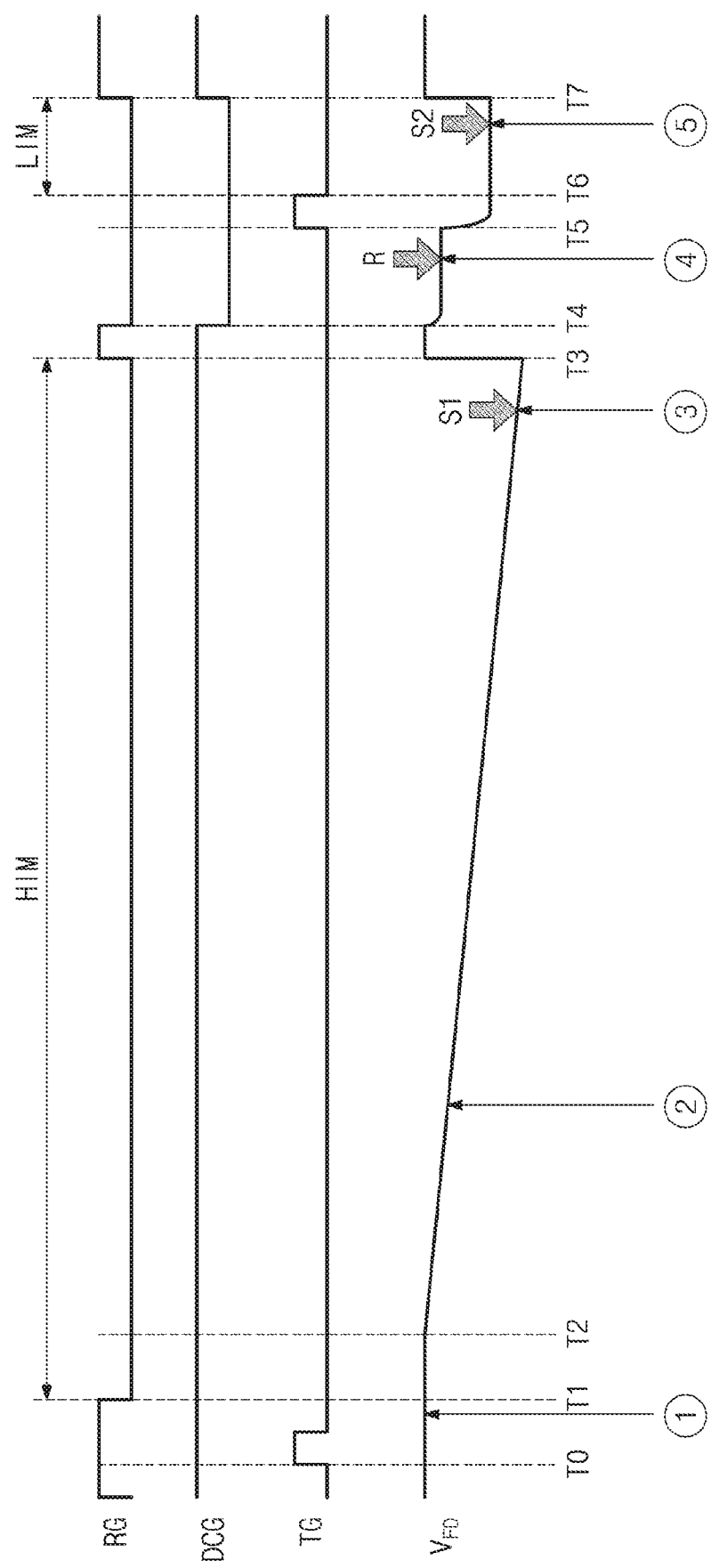
FIG. 4 is a timing diagram illustrating a method of driving a pixel sensor according to an exemplary embodiment of the inventive concept.

FIG. 4 is a timing diagram illustrating a method of driving a pixel sensor according to an exemplary embodiment of the inventive concept.

Referring to FIG. 4, the pixel sensor 112a may perform sensing by using the dynamic range capacitor $C_{DR}$ in the high-illuminance mode, without loss of overflowed charges.

At a time T0, the reset signal RG, the dual conversion gain control signal DCG, and the transfer signal TG that are provided to the pixel sensor 112a are turned on. In this case, the reset transistor RX, the transfer transistor TX, and the dual conversion gain transistor DCG are turned on, and the floating diffusion area FD and the photodiode PD are connected to the terminal for the power supply voltage $V_{PIX}$. Charges that are present in the floating diffusion area FD and the photodiode PD are drained toward the terminal for the power supply voltage $V_{PIX}$. As a result, the floating diffusion area FD and the photodiode PD are reset.

At a time T1, the high-illuminance mode starts. In FIG. 4, the high-illuminance mode is indicated by HIM. After the time T1, the dual conversion gain control signal DCG maintains a high level, and the reset signal RG and the transfer signal TG maintain a low level. As the reset signal RG is maintained at the low level in a state in which the dual conversion gain control signal DCG is at the high level, the dynamic range capacitor $C_{DR}$ is connected with the floating diffusion area FD. For example, the capacity $C_{FD}$ of the floating diffusion area FD and the dynamic range capacitor $C_{DR}$ are connected in parallel. In addition, because the transfer signal TG is at the low level, the transfer transistor TX is turned off. Under this condition, in the case in which a large amount of light is incident on the photodiode PD, photoelectric conversion is generated in the photodiode PD. Charges that are generated by the photoelectric conversion first start to be accumulated in the photodiode PD.

At a time T2, charges accumulated in the photodiode PD start to overflow. Charges overflowing over a gate potential barrier of the transfer transistor TX in the process of charge generation and charge integration by the photoelectric conversion of the photodiode PD move to the floating diffusion area FD. For example, the overflowed charges are integrated in the floating diffusion area FD and the dynamic range capacitor $C_{DR}$. As such, a voltage $V_{FD}$ of the floating diffusion area FD starts to gradually decrease from the power supply voltage $V_{PIX}$.

Sampling for the high-illuminance mode is performed at a time (marked by ③) before the high-illuminance mode ends. For example, a first voltage S1 corresponding to the amount of charges held in the floating diffusion area FD and the dynamic range capacitor $C_{DR}$ by the overflowed charges from the photodiode PD may be sampled during sampling for the high-illuminance mode (e.g., the first voltage S1 corresponds to $S1_{SIG}$).

At a time T3, the reset signal RG transitions to the high level, and thus, the reset transistor RX is turned on. The charges held in the floating diffusion area FD and the dynamic range capacitor $C_{DR}$ in a high-illuminance interval may be drained to the terminal for the power supply voltage $V_{PIX}$ through the reset transistor RX. As such, the voltage $V_{FD}$ of the floating diffusion area FD is reset to the level of the power supply voltage $V_{PIX}$.

At a time T4, the reset signal RG and the dual conversion gain control signal DCG transition to the low level, and thus, the dual conversion gain transistor DCGX is turned off. In this case, the floating diffusion area FD and the dynamic range capacitor $C_{DR}$ are electrically disconnected from each other. In addition, the floating diffusion area FD is disconnected from the power supply voltage $V_{PIX}$. This means that the high-illuminance mode ends.

Between the time T4 and a time T5, a voltage of the floating diffusion area FD stabilized after the reset operation is sampled as the reset level R. For example, the reset level R is sampled at a time (marked by ④) when the floating diffusion area FD maintains a stable reset state.

At the time T5, the transfer signal TG transitions to the high level. The low-illuminance mode starts at the time T5. In FIG. 4, the low-illuminance mode is indicated by LIM. The transfer transistor TX is turned on, and charges accumulated in the photodiode PD move to the floating diffusion area FD. In this case, the dynamic range capacitor $C_{DR}$ is in a disconnected state from the floating diffusion area PD. Accordingly, charges accumulated in the photodiode PD may move only to the floating diffusion area FD.

At a time T6, the transfer signal TG transitions to the low level, and thus, the transfer transistor TX is turned off. In this case, the movement of charges accumulated in the photodiode PD to the floating diffusion area FD is blocked.

Sampling for the low-illuminance mode is performed between the time T6 and a time T7 (marked by ⑤). For example, a second voltage S2 corresponding to the amount of charges held in the floating diffusion area FD may be sampled during sampling for the low-illuminance mode (e.g., the second voltage corresponds to $S2_{SIG}$).

At the time T7, the reset signal RG and the dual conversion gain control signal DCG transition to the high level, and thus, the charges held in the floating diffusion area FD may be drained to the terminal for the power supply voltage $V_{PIX}$ through the reset transistor RX. As such, the voltage $V_{FD}$ of the floating diffusion area FD is reset to the level of the power supply voltage $V_{PIX}$.

As described above with reference to the timing diagram, an image sensor according to exemplary embodiments of the inventive concept provides a low conversion gain in the high-illuminance mode in which the dynamic range capacitor $C_{DR}$ is used. The image sensor may provide a high conversion gain in the low-illuminance mode in which the dynamic range capacitor $C_{DR}$ is not used, and may thus perform low-noise and high-sensitive sampling. As a result, a wide dynamic range (WDR) function may be efficiently implemented through the image sensor according to exemplary embodiments of the inventive concept.

Figure 5:
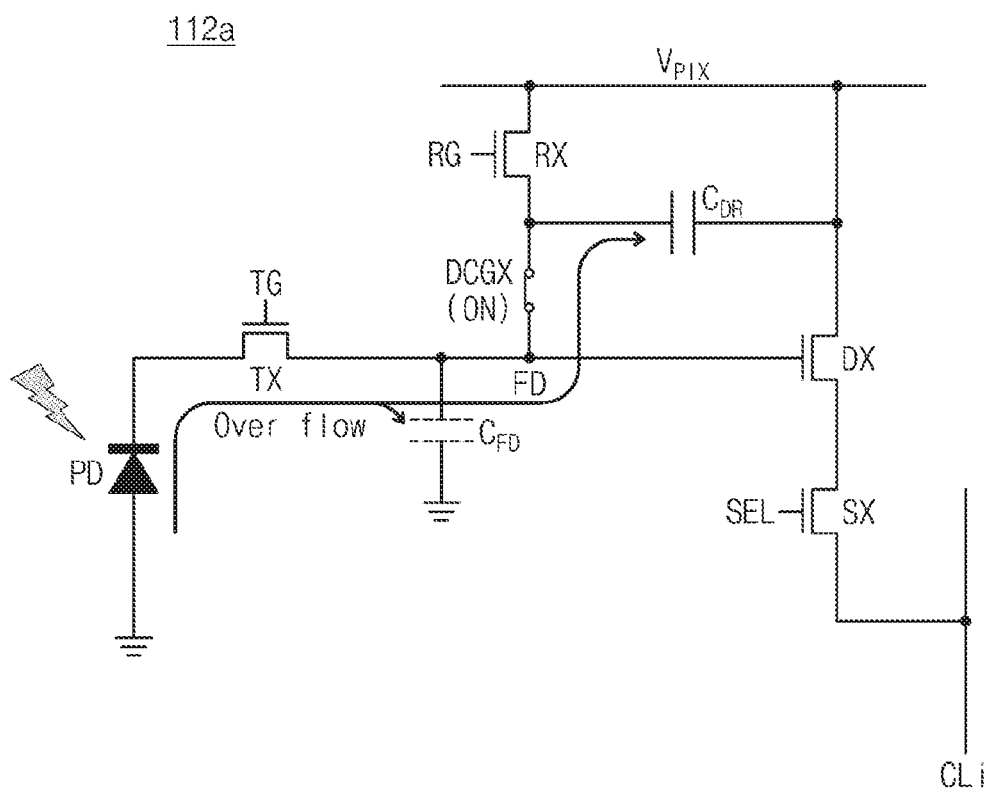
FIGS. 5 and 6 are diagrams illustrating a characteristic of a pixel sensor operating in a high-illuminance mode according to an exemplary embodiment of the inventive concept.
Figure 6:
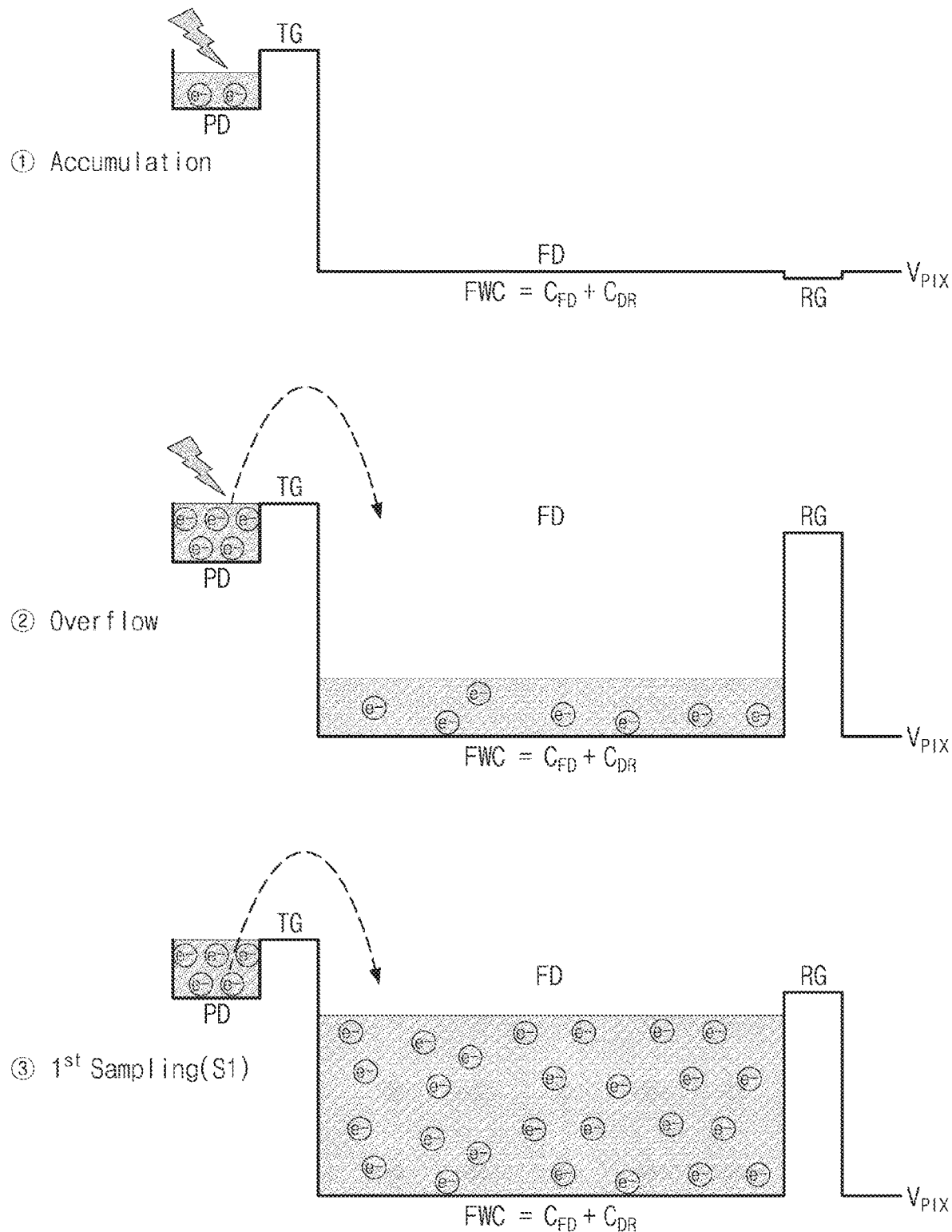

FIGS. 5 and 6 are diagrams illustrating a characteristic of a pixel sensor operating in a high-illuminance mode according to an exemplary embodiment of the inventive concept. FIG. 5 is a circuit diagram illustrating a low conversion gain condition implemented by the dynamic range capacitor $C_{DR}$ in the high-illuminance mode. FIG. 6 is a diagram illustrating a potential state of the pixel sensor 112a according to an exemplary embodiment of the inventive concept in the high-illuminance mode.

Referring to FIG. 5, in the high-illuminance mode, the floating diffusion area FD of the pixel sensor 112a is electrically connected to the dynamic range capacitor $C_{DR}$. For example, in the high-illuminance mode, overflowed charges from the photodiode PD are not drained and are instead held by using an expanded full well capacity FWC. The expanded full well capacity FWC may make a potential change of the floating diffusion area FD relatively small compared to the amount of overflowed charges. For example, a conversion gain of the pixel sensor 112a becomes small in the high-illuminance mode. This is accomplished by activating the dual conversion gain control signal DCG to be provided to the pixel sensor 112a such that the dual conversion gain transistor DCGX is turned on. In this case, the dual conversion gain transistor DCGX may always be maintained in a turn-on state while an operation is performed in the high-illuminance mode. A turn-on interval of the dual conversion gain transistor DCGX corresponds to a time interval from T1 to T3 of FIG. 4 described above.

Since the dual conversion gain transistor DCGX is turned on, overflowed charges from the photodiode PD are accumulated in the floating diffusion area FD and the dynamic range capacitor $C_{DR}$. Compared to the capacity $C_{FD}$ provided by the floating diffusion area FD, the full well capacity FWC of the pixel sensor 112a may be markedly increased due to the dynamic range capacitor $C_{DR}$ implemented with a cylinder-type capacitor. For example, the full well capacity FWC may be increased by as much as about 100 times or more. By using the dynamic range capacitor $C_{DR}$, in an exemplary embodiment, overflowed charges from the photodiode PD are not discarded, and are used to sense and sample a light of high illuminance.

A sensing operation of the high-illuminance mode, which is performed by using the increased full well capacity FWC in a state in which the dual conversion gain transistor DCGX is turned on, is illustrated in FIG. 6. The full well capacity FWC of the pixel sensor 112a in the high-illuminance mode corresponds to a sum of the capacity $C_{FD}$ of the floating diffusion area FD and a capacity of the dynamic range capacitor $C_{DR}$. Accordingly, the full well capacity FWC, which is significantly greater than the capacity $C_{FD}$ of the floating diffusion area FD, may be provided in the high-illuminance mode. The high-illuminance mode operation may be divided into three phases under the condition that the full well capacity FWC increases. The three phases correspond to the times ①, ②, and ③ described with reference to FIG. 4, respectively.

First, at the time ①, a charge accumulation phase of the photodiode PD, which is an early operation of the high-illuminance mode, is performed. In general, photoelectric conversion is generated in response to light incident on the photodiode PD, and charges that are generated until the transfer transistor TX is turned on are accumulated. Due to a channel potential barrier of the transfer transistor TX, the charges accumulated in the photodiode PD do not move to the floating diffusion area FD and are blocked. As can be seen from FIG. 6, the full well capacity FWC markedly increases as the floating diffusion area FD and the dynamic range capacitor $C_{DR}$ are connected. For example, the full well capacity FWC corresponds to a sum ($C_{FD}+C_{DR}$) of capacities of the full well capacity FWC and the dynamic range capacitor $C_{DR}$.

The time ② shows an overflow phase in which overflowed charges from the photodiode PD are stored in the floating diffusion area FD and the dynamic range capacitor $C_{DR}$. In general, in the case in which the amount of charges that are generated in the photodiode PD exceeds a maximum capacity of the photodiode PD, charges overflow over the channel potential barrier of the transfer transistor TX being in an off state. This is called a blooming phenomenon. According to the blooming phenomenon, overflowed charges may travel to the photodiode PD of any other pixel sensor over the channel potential barrier of the transfer transistor TX. The overflowed charges are drained and discarded to prevent the blooming phenomenon.

The pixel sensor 112a does not drain the overflowed charges from the photodiode PD, and stores the overflowed charges in the floating diffusion area FD and the dynamic range capacitor $C_{DR}$. The reason is that a magnitude of the full well capacity FWC secured through the dynamic range capacitor $C_{DR}$ according to an exemplary embodiment may sufficiently accommodate overflowed charges from the photodiode PD. As illustrated in FIG. 6, the integration of the overflowed charges may make a potential of the floating diffusion area FD low.

At the time ③, a voltage of the floating diffusion area FD, which is formed by the overflowed charges in the high-illuminance mode, is sampled (or read). For example, a potential of the floating diffusion area FD corresponding to the amount of overflowed charges in the high-illuminance mode may be sampled. An operation of sampling the first voltage S1 of the floating diffusion area FD in the high-illuminance mode is referred to herein as first sampling.

The high-illuminance-mode operation is described with reference to FIGS. 5 and 6. In the high-illuminance mode, the pixel sensor 112a may store the overflowed charges by using the dynamic range capacitor $C_{DR}$. Exemplary embodiments of the inventive concept implement a wide dynamic range WDR capable of sensing light of high illuminance without saturation by sampling the overflowed charges with a low conversion gain in a state in which the overflowed charges are not drained.

Figure 7:
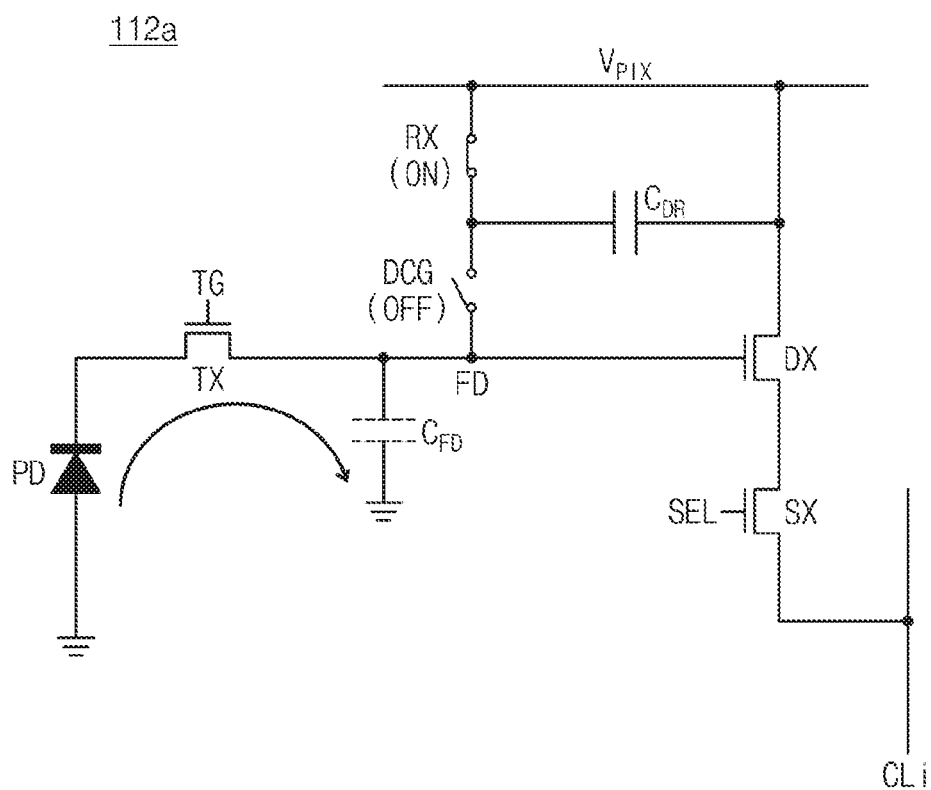
FIGS. 7 and 8 are diagrams illustrating a characteristic of a pixel sensor operating in a low-illuminance mode according to an exemplary embodiment of the inventive concept.
Figure 8:
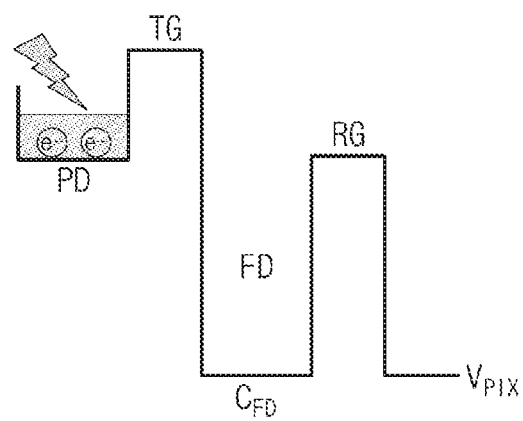
Figure 8:
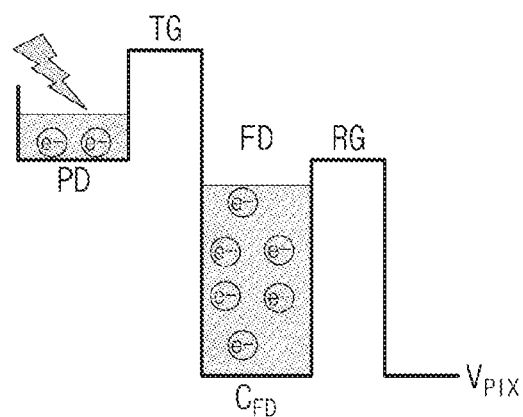

FIGS. 7 and 8 are diagrams illustrating a characteristic of a pixel sensor operating in a low-illuminance mode according to an exemplary embodiment of the inventive concept. FIG. 7 is a circuit diagram illustrating a high conversion gain HCG condition since the dynamic range capacitor $C_{DR}$ is disconnected from the floating diffusion area FD in the low-illuminance mode. FIG. 8 is a diagram illustrating a potential state of the pixel sensor 112a in the low-illuminance mode.

Referring to FIG. 7, in the low-illuminance mode, the floating diffusion area FD of the pixel sensor 112a is electrically disconnected from the dynamic range capacitor $C_{DR}$. For example, in an exemplary embodiment, in the low-illuminance mode, charges accumulated in the photodiode PD are stored only in the floating diffusion area FD. In the low-illuminance mode, the high conversion gain HCG may be provided through sampling using the floating diffusion area FD of a relatively small capacity. This is accomplished by deactivating the dual conversion gain control signal DCG to be provided to the pixel sensor 112a such that the dual conversion gain transistor DCGX is turned off. In contrast, the reset signal RG may be activated such that the reset transistor RX is turned on. In this case, the dual conversion gain transistor DCGX may always be maintained in a turn-off state while an operation is performed in the low-illuminance mode. A turn-off interval of the dual conversion gain transistor DCGX corresponds to a time interval from T6 to T7 of FIG. 4 described above.

In the turn-on state of the reset transistor RX and the turn-off state of the dual conversion gain transistor DCGX, charges accumulated in the photodiode PD are stored in the floating diffusion area FD when the transfer transistor TX is turned on. Since the dynamic range capacitor $C_{DR}$ is disconnected from the floating diffusion area FD in the low-illuminance mode, the full well capacity FWC may sharply decrease compared with in the high-illuminance mode. Low-noise and high-sensitive image sensing may be implemented through sampling of the low-illuminance mode.

Potential states at two times ④ and ⑤ illustrated in FIG. 4 are illustrated in FIG. 8. First, an operation of resetting the floating diffusion area FD and sampling the reset level R of the reset floating diffusion area FD is performed at the time ④. A second sampling operation of sampling the level of the second voltage S2 of the floating diffusion area FD in the low-illuminance mode may be performed at the time ⑤.

When the second sampling in the low-illuminance mode is completed, the floating diffusion area FD of the pixel sensor 112a is reset. For example, since the dual conversion gain transistor DCGX and the reset transistor RX are turned on, charges accumulated in the floating diffusion area FD are drained toward the terminal for the power supply voltage $V_{PIX}$. When the floating diffusion area FD is completely reset, the reset level R is sampled. The sampling of the reset level R is performed in a state in which the transfer transistor TX and the reset transistor RX are turned off.

When the reset operation and the sampling of the reset level R are completed, the transfer transistor TX is turned on between the time T5 and the time T6. In this case, charges accumulated in the photodiode PD in the low-illuminance mode are introduced to the floating diffusion area FD. In the low-illuminance mode, the floating diffusion area FD is electrically disconnected from the dynamic range capacitor $C_{DR}$. In the low-illuminance mode, charges accumulated in the photodiode PD are stored only in the floating diffusion area FD. The full well capacity FWC of the pixel sensor 112a in the low-illuminance mode corresponds to the capacity $C_{FD}$ of the floating diffusion area FD. Accordingly, charges are transferred to the floating diffusion area FD at relatively high speed when the transfer transistor TX is turned on.

When a charge transfer from the photodiode PD to the floating diffusion area FD is completed, the transfer transistor TX is turned off. The second sampling, in which a potential of the second voltage S2 of the floating diffusion area FD formed by the amount of integrated charges in the low-illuminance mode, may be performed. As the full well capacity FWC decreases in the low-illuminance mode, the pixel sensor 112a may operate under a relatively low-noise and high-sensitive condition.

A potential of a pixel sensor at different times according to an exemplary embodiment of the inventive concept is described above. In the exemplary embodiment, the wide dynamic range WDR may be implemented by providing different full well capacities FWC at high illuminance and low illuminance.

Figure 9:
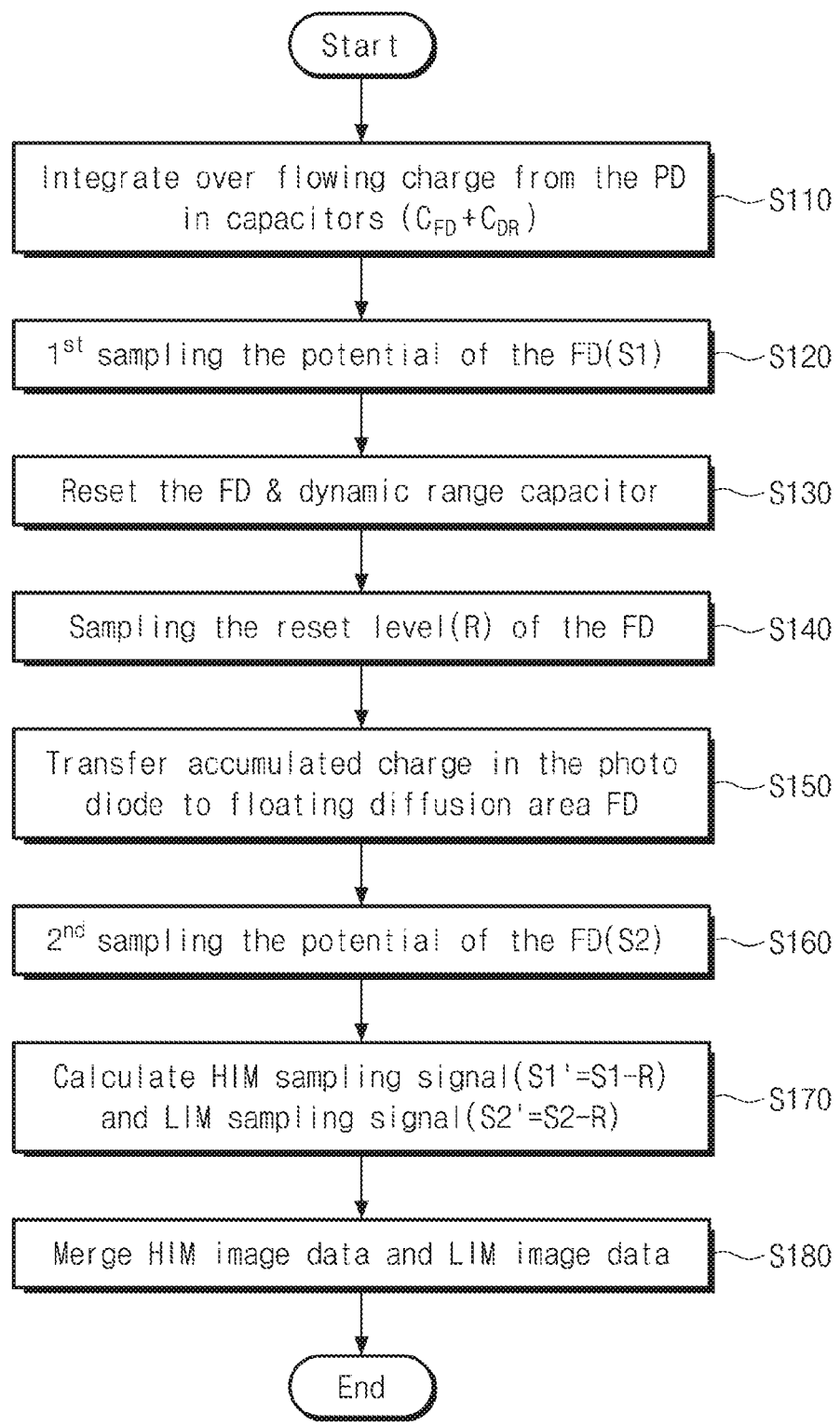
FIG. 9 is a flowchart illustrating an operating method of an image sensor implementing a wide dynamic range (WDR) using a pixel sensor according to an exemplary embodiment of the inventive concept.

FIG. 9 is a flowchart illustrating an operating method of an image sensor implementing a wide dynamic range (WDR) using a pixel sensor according to an exemplary embodiment of the inventive concept.

Referring to FIG. 9, the image sensor 100 (refer to FIG. 1) may sample an image of a wide dynamic range WDR without charge loss.

In operation S110, the image sensor 100 may accumulate overflowed charges from the photodiode PD by using the dynamic range capacitor $C_{DR}$ in the high-illuminance mode without loss. For example, in the high-illuminance mode, the dynamic range capacitor $C_{DR}$ is connected to the floating diffusion area FD. In this state, the charges accumulated in the photodiode PD may start to overflow. The overflowed charges are integrated by using a capacity ($C_{FD}+C_{DR}$) that is provided by the dynamic range capacitor $C_{DR}$ and the floating diffusion area FD. This capacity may be referred to as, for example, a first full well capacity FWC. The integration of the overflowed charges (e.g., negative charges) may make a potential of the floating diffusion area FD gradually decrease.

In operation S120, first sampling in the high-illuminance mode is performed. For example, the first voltage S1 corresponding to the amount of charges integrated in the floating diffusion area FD and the dynamic range capacitor $C_{DR}$ by the overflowed charges from the photodiode PD may be sampled.

In operation S130, a potential of the floating diffusion area FD and the dynamic range capacitor $C_{DR}$ is reset. For example, the charges integrated in the floating diffusion area FD and the dynamic range capacitor $C_{DR}$ in the high-illuminance interval may be drained to the terminal for the power supply voltage $V_{PIX}$ through the reset transistor RX. As such, the voltage $V_{FD}$ of the floating diffusion area FD is reset to the level of the power supply voltage $V_{PIX}$.

In operation S140, the reset level R of the floating diffusion area FD is sampled. When the dual conversion gain transistor DCGX is turned off after the reset operation, the floating diffusion area FD and the dual conversion gain transistor DCGX are electrically disconnected from each other. As such, the potential of the floating diffusion area FD may be stabilized at the reset level R. In this case, the reset level R may be sampled.

In operation S150, the low-illuminance mode starts. The transfer transistor TX is turned on, and charges accumulated in the photodiode PD move to the floating diffusion area FD.

In this case, the dynamic range capacitor $C_{DR}$ is in a disconnected state from the floating diffusion area FD. Accordingly, charges accumulated in the photodiode PD may move only to the floating diffusion area FD. For example, the charges may be integrated with a second full well capacity FWC (e.g., corresponding to only the floating diffusion area FD), which is smaller than the first full well capacity FWC (e.g., corresponding to the dynamic range capacitor $C_{DR}$ and the floating diffusion area FD).

In operation S160, second sampling corresponding to sampling for the low-illuminance mode is performed. The transfer transistor TX may be turned off, and a potential formed by the charges integrated in the floating diffusion area FD may be sampled. For example, the second voltage S2 corresponding to the amount of charges integrated in the floating diffusion area FD may be sampled during the second sampling.

In operation S170, a first sampling signal S1' (=S1−R) corresponding to the light sampled in the high-illuminance mode and a second sampling signal S2' (=S2−R) corresponding to the light sampled in the low-illuminance mode are calculated. Here, the first sampling signal S1' (=S1−R) may be generated in a non-correlated double sampling manner, and the second sampling signal S2' (=S2−R) may be generated in a correlated double sampling manner.

In operation S180, the first sampling signal S1' (=S1−R) corresponding to an image signal in the high-illuminance mode (HIM) and the second sampling signal S2' (=S2−R) corresponding to an image signal in the low-illuminance mode (LIM) are merged.

As described above, the image sensor 100 according to an exemplary embodiment of the inventive concept provides a low conversion gain in the high-illuminance mode in which the dynamic range capacitor $C_{DR}$ is used. The image sensor 100 may provide a high conversion gain in the low-illuminance mode in which the dynamic range capacitor $C_{DR}$ is not used, and may thus perform low-noise and high-sensitive sampling. As a result, a wide dynamic range (WDR) function may be efficiently implemented through the image sensor 100.

Figure 10:
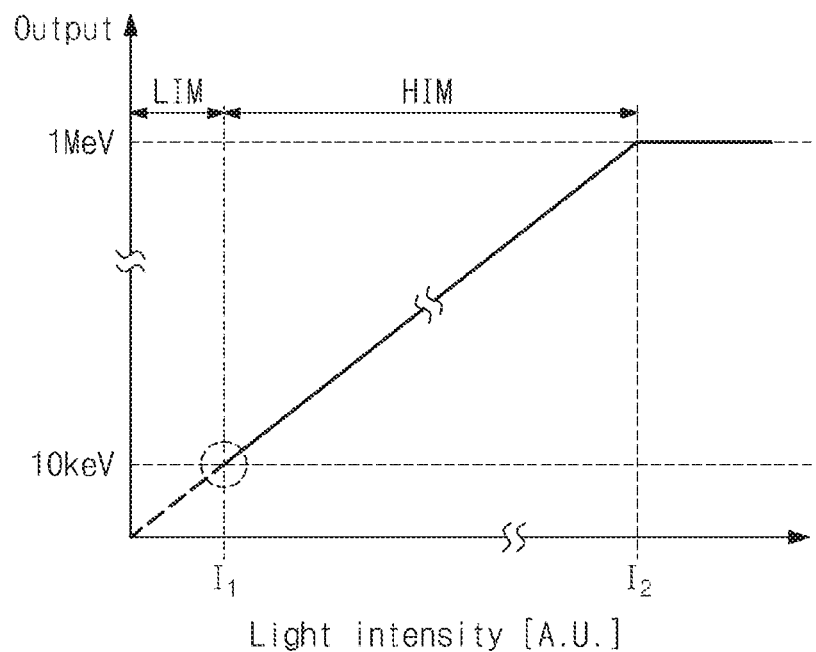
FIG. 10 is a graph illustrating an expanded dynamic range of an image sensor according to an exemplary embodiment of the inventive concept.

FIG. 10 is a graph illustrating an expanded dynamic range of an image sensor according to an exemplary embodiment of the inventive concept.

It can be seen from FIG. 10 that the SNR dip markedly decreases as the pixel sensor 112a of an exemplary embodiment of the inventive concept controls the full well capacity FWC for the purpose of expanding a dynamic range.

In the low-illuminance mode LIM, the full well capacity FWC of the pixel sensor 112a corresponds to the capacity $C_{FD}$ provided by the floating diffusion area FD. Here, it is assumed that the capacity $C_{FD}$ of the floating diffusion area FD is about 10 keV. According to this assumption, light may be sensed without saturation in the low-illuminance mode LIM until the intensity $I_1$ of light.

In the high-illuminance mode HIM in which the intensity of light is greater than the intensity $I_1$ of light, the full well capacity FWC is expanded by using the dynamic range capacitor $C_{DR}$. As such, overflowed charges from the photodiode PD may be accommodated. For example, assuming that the capacity $C_{DR}$ provided through the dynamic range capacitor $C_{DR}$ is about 1 MeV, a dynamic range may be expanded by as much as about 100 times or more. Accordingly, the pixel sensor 112a may provide a linear characteristic without saturation at illuminance corresponding to the intensity $I_2$ of light or smaller.

In the operating method of the pixel sensor 112a according to an exemplary embodiment of the inventive concept, sampling is performed through the floating diffusion area FD even in sampling the amount of overflowed charges. Accordingly, linearity may be maintained between a low-illuminance signal and a high-illuminance signal in merging the signals.

Figure 11:
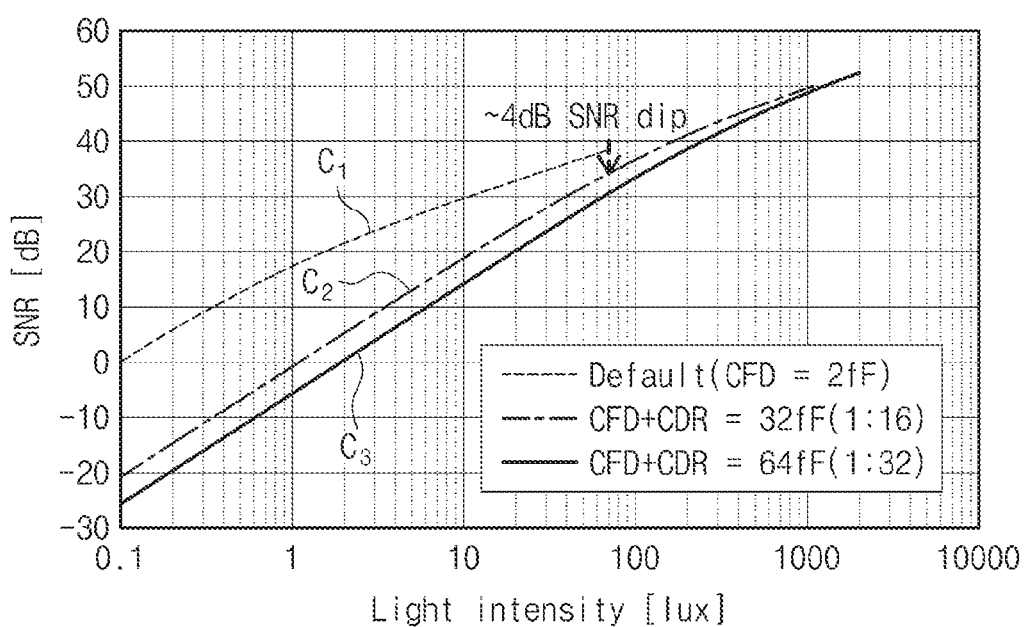
FIG. 11 is a graph briefly illustrating an effect of an exemplary embodiment of the inventive concept.

FIG. 11 is a graph briefly illustrating an effect of an exemplary embodiment of the inventive concept. Curves of SNR of the pixel sensor 112a according to the intensity of light are illustrated in FIG. 11 with regard to magnitudes of the full well capacity FWC.

A curve $C_1$ shows the SNR in a default operating mode in which the dynamic range capacitor $C_{DR}$ is not applied. For example, the curve $C_1$ shows a characteristic of the SNR in the case in which the magnitude of the full well capacity FWC is 2 fF corresponding to only the capacity $C_{FD}$ of the floating diffusion area FD. A curve $C_2$ shows a characteristic of the SNR in the case in which the magnitude of the full well capacity FWC is expanded to 32 fF by using the dynamic range capacitor $C_{DR}$. In this case, an SNR dip of about 4 dB appears compared to the SNR in the default operating mode. A curve $C_3$ shows a characteristic of the SNR in the case in which the magnitude of the full well capacity FWC is expanded to 64 fF by using the dynamic range capacitor $C_{DR}$. In this case, an SNR dip of about 7 dB appears compared to the SNR in the default operating mode.

According to a driving method of the pixel sensor 112a according to an exemplary embodiment of the inventive concept, in the case in which a dynamic range changes, although the SNR dip may occur, the SNR dip may be decreased compared to a conventional pixel sensor.

As is traditional in the field of the inventive concept, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies.

In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the exemplary embodiments may be physically separated into two or more interacting and discrete blocks, units and/or modules without departing from the scope of the inventive concept. Further, the blocks, units and/or modules of the exemplary embodiments may be physically combined into more complex blocks, units and/or modules without departing from the scope of the inventive concept.

According to an exemplary embodiment of the inventive concept, an image sensor that may be implemented in a small area is provided, the size of a pixel may be reduced, and a high quality image free of a substantial SNR dip may be realized.

While the inventive concept has been particularly shown and described with reference to the exemplary embodiments thereof, it will be understood by those of ordinary skill in the art that various changes in form and detail may be made therein without departing from the spirit and scope of the inventive concept as defined by the following claims.

What is claimed is:

1. A method of driving an image sensor, comprising:
integrating an overflowed charge from a photodiode in a floating diffusion area and a dynamic range capacitor, wherein the dynamic range capacitor is formed between the floating diffusion area and a power supply voltage;
sampling a first voltage formed in the floating diffusion area by the integrated overflowed charge during a high-illuminance mode in which the dynamic range capacitor is connected to the floating diffusion area;
resetting the photodiode, the floating diffusion area, and the dynamic range capacitor;
sampling a reset level of the reset floating diffusion area;
transferring a charge accumulated in the photodiode to the floating diffusion area; and
sampling a second voltage formed in the floating diffusion area during a low-illuminance mode in which the dynamic range capacitor is disconnected from the floating diffusion area, wherein the low-illuminance mode begins after the high-illuminance mode has ended.

2. The method of claim 1, further comprising:
electrically disconnecting the dynamic range capacitor from the floating diffusion area after the resetting.

3. The method of claim 1, wherein the dynamic range capacitor is a cylinder-type capacitor formed under the photodiode.

4. The method of claim 1, further comprising:
generating a high-illuminance image signal using the first voltage and the reset level.

5. The method of claim 4, wherein the high-illuminance image signal is generated in a non-correlated double sampling manner using the first voltage and the reset level.

6. The method of claim 4, further comprising:
generating a low-illuminance image signal using the second voltage and the reset level.

7. The method of claim 6, wherein the low-illuminance image signal is generated in a correlated double sampling manner using the second voltage and the reset level.

8. The method of claim 6, further comprising:
generating a wide dynamic range image by merging the low-illuminance image signal and the high-illuminance image signal.

9. An image sensor, comprising:
a photodiode configured to generate a charge in response to an incident light;
a floating diffusion area in which the charge transferred from the photodiode is stored;
a transfer transistor configured to connect the photodiode to the floating diffusion area in response to a transfer signal;
a dynamic range capacitor configured to expand a capacity of the floating diffusion area;
a dual conversion gain transistor configured to connect the dynamic range capacitor to the floating diffusion area in a high-illuminance mode, and to disconnect the dynamic range capacitor from the floating diffusion area in a low-illuminance mode; and
a reset transistor configured to connect the dual conversion gain transistor to a power supply voltage in response to a reset signal,
wherein the dynamic range capacitor is formed of a cylinder-type electrode and a dielectric, and is formed in a semiconductor layer different from the floating diffusion area.

10. The image sensor of claim 9, wherein, in the high-illuminance mode, the transfer transistor and the reset transistor are turned off, the dual conversion gain transistor is turned on, and an overflowed charge from the photodiode is integrated in the floating diffusion area and the dynamic range capacitor.

11. The image sensor of claim 10, wherein a first voltage corresponding to a charge integrated in the floating diffusion area and the dynamic range capacitor is sampled in the high-illuminance mode.

12. The image sensor of claim 11, wherein, when operation in the high-illuminance mode is completed, the dual conversion gain transistor and the reset transistor are turned on, and the floating diffusion area and the dynamic range capacitor are reset.

13. The image sensor of claim 12, wherein a reset level corresponding to a potential of the reset floating diffusion area is sampled as a reference voltage.

14. The image sensor of claim 13, wherein, in the low-illuminance mode, the dual conversion gain transistor is turned off, and a charge accumulated in the photodiode is transferred to the floating diffusion area.

15. The image sensor of claim 14, wherein, in the low-illuminance mode, a second voltage corresponding to a potential of the floating diffusion area is sampled.

16. A method of driving an image sensor, comprising:
integrating an overflowed charge from a photodiode with a first full well capacity;
sampling a first voltage formed by the overflowed charge integrated with the first full well capacity;
sampling a reset level of a floating diffusion area;
integrating a charge accumulated in the photodiode with a second full well capacity smaller than the first full well capacity;
sampling a second voltage formed by the charge integrated with the second full well capacity;
generating a high-illuminance image signal using the first voltage and the reset level; and
generating a low-illuminance image signal by processing the second voltage and the reset level in a correlated double sampling manner.

17. The method of claim 16, wherein the first full well capacity comprises a capacity of the floating diffusion area and a capacity of a dynamic range capacitor, and the second full well capacity comprises the capacity of the floating diffusion area.

18. The method of claim 17, wherein the dynamic range capacitor comprises a cylinder-type capacitor element formed in a semiconductor layer different from the floating diffusion area.

19. The method of claim 16, wherein, in integrating the overflowed charge with the first full well capacity, a transfer transistor connecting the photodiode to the floating diffusion area is turned off.

20. The method of claim 16, further comprising:
forming a wide dynamic range (WDR) image by merging the high-illuminance image signal and the low-illuminance image signal.

* * * * *